United States Patent Office 3,261,832
Patented July 19, 1966

3,261,832
PROCESS FOR 7-AMINOCEPHALOSPORANIC ACID DERIVATIVES
Brian Richard Cowley, London, Gordon Ian Gregory, Chalfont St. Peter, and Alan Gibson Long, Greenford, Middlesex, England, assignors to Glaxo Laboratories Limited, Middlesex, England, a British company
No Drawing. Filed July 9, 1964, Ser. No. 381,580
Claims priority, application Great Britain, July 15, 1963, 27,990/63
17 Claims. (Cl. 260—243)

This invention is concerned with improvements in or relating to antibiotics and in particular is concerned with derivatives of the antibotic cephalosporin C which has the structure:

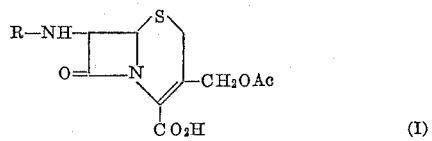

where R is the group $HOOC \cdot CH(NH_2)(CH_2)_3CO$—i.e. the α-amino-adipoyl group.

Cephalosporin C has been converted into 7-aminocephalosporanic acid (7–ACA) and the resultant amine has been acylated with various acylating agents to form 7-acylamido analogues of cephalosporin C of improved or modified activity. For example, 7-phenylacetamidocephalosporanic acid (7–PAC), obtained by reaction of 7–ACA wit a phenylacetyl halide, possesses much greater activity against certain organisms than does cephalosporin C. One may thus prepare compounds of Formula I wherein R is an acyl group other than α-aminoadipoyl. The activity of compounds of Formula I, wherein R is an acyl group, α-aminoadipoyl or otherwise, can furthtr be modified by reaction with a nucleophile which replaces the acetate group on the exocyclic methylene. Compounds of this type may be shown as having the formula:

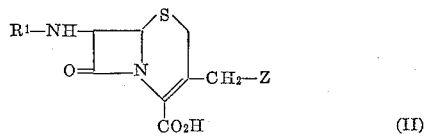

wherein $R^1$ is an acyl group and Z is the residue of the nucleophile.

For example, Z may be pyridinium group and $R^1$ phenylacetyl, viz, the compound of the formula:

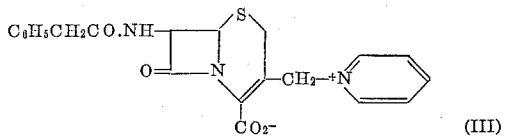

this compound being obtained, for example, by reaction of pyridine with 7–PAC in an aqueous medium.

Z may also be the residue of a nucleophile as described in Belgian Patent No. 617,687 where the use of various nucleophiles having sulphur-containing groups is described and claimed.

Compounds of Formula II where Z is pyridinium or substituted-pyridinium possess interesting antibiotic activity but existing methods for their preparation only lead to low yields of the desired end-product. Thus, in our hands, the reaction of 7–PAC with pyridine in aqueous media according to the method of Hale, Newton and Abraham, Biochem. J., 1961, 79, 403 has led to yields of only about 22%.

On the other hand, reaction of 7-acylamido-cephalosporanic acids with sulphur-containing nucleophiles may lead to higher yields but the resultant compounds may possess the disadvantage of low solubility in water which decreases their utility as antibiotics for practical purposes. Attempts to replace the sulphur-containing nucleophilic residue in these compounds with a pyridine-type nucleophile have met with little success.

We have now found that this replacement can be facilitated by the use of certain metal salts. The resultant pyridinium or substituted pyridinium derivatives of cephalosporin may be obtained in yields at least comparable with and possibly better than those obtained by direct reaction.

According to the invention, therefore, there is provided a process for the preparation of derivatives of cehalosporin of the formula:

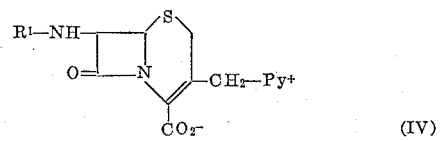

in which $R^1$ is a carboxylic acyl group selected from the group consisting of thienylacetyl and phenylacetyl and Py is selected from the group consiting of pyridine and nuclear-substituted pyridines (the pyridine reagent), the step which comprises reacting a compound of the formula:

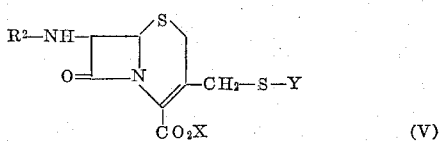

in which $R^2$ is selected from the group consisting of carboxylic acyl groups and hydrogen; the moiety —S—Y is the residue of a nucleophile YSH, and X is a cation, with a compound Py the presence of a dissolved salt of a metal selected from the group consisting of mercury, silver and gold, said salt being able to complex with the moiety —S—Y and to ionize in water, the resulting compound where $R^2$ represents hydrogen thereafter being acylated.

X may be hydrogen, an alkali metal, ammonium or quaternary ammonium.

It is to be noted that the groups $R^1$ and $R^2$ are relatively unimportant in the process according to the invention, the reaction taking place on the exocyclic methylene group.

SULPHUR COMPOUNDS

The compound of Formula V may be obtained by reaction of a compound of the formula:

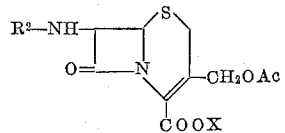

where $R^2$ and X have the meanings defined above, with a sulphur containing nucleophile (YSH or a salt thereof) or from an appropriately substituted cephalosporin precursor e.g. using the method of Belgian Patent No. 621,452. Sulphur-containing nucleophiles which may be used include those disclosed in Belgian Patent No. 617,687 i.e. thiosulphates, thiols, thioureas, thioamides or thiophenols. Of these, we have obtained good results using 2-mercapto-pyrimidines e.g. 2-mercapto-4-methylpyrimidine and alkali metal thiosulphates. We may also use the dithiocarbamates disclosed in Belgian Patent No. 637,547 or compounds of the formula $R^3 \cdot CZ \cdot H$ or $R^3 \cdot SO_2SH$, Z being sulphur or oxygen and $R^3$ being an aliphatic, aryl, araliphatic, heterocyclic or heterocyclic substituted aliphatic group or soluble salts thereof. Alternatively one may use compounds of the formula Alk O.COSH or soluble salts thereof, Alk being an alkyl group. We have obtained particularly good results with nucleophiles of the latter type and especially with thiobenzoic acid and its alkali metal salts e.g. sodium thiobenzoate; compounds of the formula:

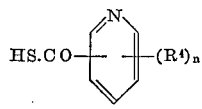

where the HS·CO— group is attached α, β or γ, preferably α or γ; $R^4$ is a $C_1$–$C_4$ alkyl group or a fused benzene ring and $n$ is 0, 1 or 2 and alkali metal salts thereof e.g. thiopicolinic acid and sodium thiopicolinate; and compounds of the formula:

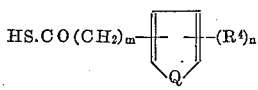

where $m$ is 0 or 1 and Q is oxygen, sulphur, NH or N-alkyl ($C_1$–$C_4$) and $R^4$ and $n$ have the meanings defined above, and alkali metal salts thereof e.g. 2-thiolcarboxymethylthiophene and its sodium salt. Where Q=NH it may be necessary to protect the hydrogen atom during preparation of the thioacid. In our hands these nucleophiles have led to high yields of compounds of Formula V.

Compounds of Formula V may be prepared by the general methods described in Belgian Patents Nos. 617,687 and 637,547 and Serial No. 381,544, now Patent No. 3,243,435.

ACYL GROUPS

Whilst $R^1$ may represent an acyl group in general terms one may use specific acyl derivatives representative of alkanoyl, alkenoyl, substituted alkanoyl e.g. aralkanoyl, aryloxyalkanoyl, S-arylthioalkanoyl and S-aralkylthioalkanoyl etc. These acyl derivatives include those having the general formulae:

(i) $R'(CH_2)_nCO$—where $R'$ is phenyl, cycloalkyl, substituted phenyl, substituted cycloalkyl or O, N or S groups, particularly 5- or 6-membered monocyclic heterocyclic, and $n$ is an integer from 1–4. Examples of this group include phenylacetyl, nitrophenyl acetyl, phenylpropionyl, cyclopentylacetyl, thienyl-2-acetyl, thienyl-3-acetyl and cyclohexylacetyl and those in applications Serial Nos. 354,127, 354,112 and 354,091, all filed in the United States on March 23, 1964.

(ii) $C_nH_{2n+1}CO$—where $n$ is an integer from 2–7. The alkyl group may be straight or branched and, if desired, may be interrupted by an oxygen or a sulphur atom or substituted by one or more halogen atoms. Examples of such groups include hexanoyl, heptanoyl, octanoyl and butylthioacetyl.

(iii) $C_nH_{2n-1}CO$—where $n$ is an integer from 2–7. The alkenyl group may be straight or branched and, if desired, may be interrupted by an oxygen or a sulphur atom. Examples of such groups include acrylyl, crotonyl and allylthioacetyl.

(iv) $R'OCR''R'''\cdot CO$—where $R'$ has the meaning defined under (i) or is an alkyl group and $R''$ and $R'''$ are the same or are different and each is a hydrogen atom or an alkyl, aryl or heterocyclic group. An example of such a group is phenoxyacetyl.

(v) $R'SCR''R'''.CO$—where $R'$, $R''$ and $R'''$ are as defined above. Examples of such thio groups include S-phenylthioacetyl, S-chlorophenylthioacetyl and S-bromophenylthioacetyl.

(vi) $R'(CH_2)_mS(CH_2)_nCR''R'''.CO$—where $R'$, $R''$ and $R'''$ are as defined above, $m$ is an integer from 1–4 and $n$ is 0 or an integer from 1–4. Examples of such a group include β-benzylthioacetyl, benzylthiopropionyl and β-phenethylthioacetyl.

(vii) $R'CO$—where $R'$ has the meaning defined above. Examples of such groups include benzoyl, substituted benzoyl and cyclopentanoyl.

In general, we prefer that $R^1$ should be selected from acyl groups of section (i).

It should be noted that, if desired, $R^1$ may be α-amidoadipoyl i.e. the acyl group of cephalosporin C or any other acyl group containing an amino group, e.g. those disclosed in Belgian Patent No. 635,137.

PYRIDINE REAGENTS

In the process according to the invention one may use nuclear-substituted pyridines in place of pyridine and examples of such substituted pyridines include α-, β and γ-picoline, lutidines, nicotinamide, isonicotinamide, nicotinic acid and isonicotinic acid and their esters. The pyridine reagent should preferably not contain sulphur. If the group $R^1$ contains a sulphur or halogen atom group the pyridine reagent may also attack the group $R^1$.

The precise nature of the pyridine reagent will depend on the nature of the end-product and its attendant antibacterial properties. For example, the pyridine reagent may be pyridine itself or one having the formula:

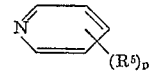

where $R^5$ is a lower alkyl, carbamoyl, N-monoloweralkylcarbamoyl, N,N-diloweralkylcarbamoyl, loweralkoxycarbonyl, hydroxyloweralkyl, N-(hydroxyloweralkyl)-carbamoyl or carbamoyl loweralkyl group and $p$ is 1, 2 or 3. The terms "lower alkyl" and "lower alkoxy" indicate groups containing 1–6, preferably 1–2, carbon atoms. The pyridine molecule may be substituted with two or more different species of the group $R^5$.

METAL SALTS

One may use salts of silver, mercury or gold. We particularly prefer to use mercuric ($Hg^{++}$) salts. The efficacy of the reaction is also dependent on other factors including the nature of the anion of the salt, the type of cations which it produces in aqueous solution and the solubility of the salt in water.

The metal salt is advantageously one of the formula $HgD_2$ or HgD which furnishes $Hg^{++}$ and/or $HgD^+$ cations, preferably the former, in aqueous solution, $D^-$ being a weakly nucleophilic anion; a like-acting salt $Hg_nE_2$ of mercury with a di- or polyvalent anion where E is an $n$-valent anion, $n$ being 2 or greater, or a salt of the formula $Ag_mF$ where F is an $m$-valent anion of a weakly nucleophilic nature and $m$ is 1 or greater.

The anion of the salt should be substantially non-oxidising to compound (V) and especially to the moiety —S—Y under the conditions of the reaction and should preferably be an anion of a strong acid, i.e. an acid having a pKa value in aqueous solution of less than 2, to facilitate formation of the desired cations.

Nucleophilic properties in the anion may compete with those in the chosen nucleophile; therefore it is desirable that the anion have a nucleophilic constant less than that of the acetate ion for conventional one-step nucleophilic displacement in aqueous media at a tetrahedral carbon centre (see, for example, Hine's "Physical Organic Chemistry," McGraw-Hill, 1962, pp. 159–161). Mercuric salts with anions of nucleophilic constant less than acetate generally promote fast reactions of the required type. Solubility of the salt in water is also an important factor: mercuric sulphate gives anions in water with a nucleophilic constant slightly less than that of acetate, but is less soluble in water than mercuric acetate, and has been found by us to be inferiour as a promoter in the displacement of the thiobenzoyl moiety. Mercuric and silver salts with the attributes described above include the perchlorate, nitrate, trifluoroacetate and tetrafluoroborate. Mercurous perchlorate also possesses the desired properties.

The metal salt should be used in an amount at least equivalent to the compound of Formula V, and is desirably used in several fold excess e.g. 2–5 equivalents.

Instead of using the metal salt and compound of Formula V one may use a salt of an appropriate metal with the compound of Formula V, e.g. the silver salt, and this may be preformed or formed in situ in the reaction mixture.

Since the pyridine reagents react with the metal salts to form well defined complexes these complexes may be used in place of the single metal salts. For example, pyridine and mercuric perchlorate react in water to form a compound probably having the structure:

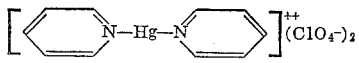

The use of such complexes may be advantageous in place of single metal salts where the latter are apt to decompose in aqueous solution thus enabling one to control the metal ion concentration more accurately.

REACTION CONDITIONS (i) *Aqueous media.*—In general we prefer to use water as the reaction medium even though the water may enter into the reaction and complete as a nucleophile with the pyridine reagent. Although the reaction may be conducted under non-aqueous polar conditions with reasonable success, the best overall yields, other factors being constant, appear to be obtained when using water as the reaction medium presumably because this facilitates the formation of the desired metal salt cations which in turn appear to be essential to the success of the reaction. The water may be added to the other reactants either in the context of an aqueous solution of the pyridine reagent or of the metal salt. If the pyridine reagent is of low solubility in water, water-miscible organic solvents may be used to improve solubility. The reaction is preferably effected at a temperature in the range of 20° to 100° C., the range of 35° to 70° C. being particularly effective. The reaction may, in general, be effected in a shorter time than is possible in the direct replacement of the acetate group. This reduces the destructive effect of the pyridine reagent on the required product.

The course of the reaction may be followed by paper electrophoresis. Compounds of Formula IV are normally betaines. However, they behave as weak bases during protonation at pH 1.9, so that they may be separated from crude mixtures by paper electrophoresis. The fractions are detected as dark spots when the paper is viewed under ultra-violet light; the zone may be cut out, irrigated with water, and the amount of betaine assessed by ultra-violet absorption of the aqueous solution. For example if $R^1$ in Formula IV is thienylacetyl, then the ratio of the optical density at 240 m$\mu$ to that at 255 m$\mu$ is a guide to the purity of the fraction: for this particular betaine the ratio should be 1.09:1 and the $E^{1\%}_{1cm.}$ 384 at 240 m$\mu$ and 351 at 255 m$\mu$.

On completion of the reaction, the product contains a salt of the residue of the moiety —S—Y which may be filtered off. Any remaining metallic ions may be removed by precipitation (e.g. as their sulphides, by means of $H_2S$). The desired end-products are soluble in water and may be freed of acidic impurities by percolation through an anion-exchange resin. The aqueous eluates may then be concentrated by freeze drying and the residue purified by crystallisation.

(ii) *Non-aqueous polar media.*—The reaction can also be effected in substantially non-aqueous organic polar media (i.e. solvents having a dielectric constant of at least 30) 15 and preferably at least the conditions and reagents being generally otherwise as described above. The reaction may however be effected at any temperature up to the boiling point of the reaction mixture consistent with the stability of the reagents. The course of the reaction may also be followed electrophoretically as described above.

Organic polar media which may be used include lower alkanoic acid nitriles e.g. acetonitrile or propionitrile; lower nitroalkanes, e.g. nitromethane; nitro-aromatic compounds, e.g. nitrobenzene; amides of the general formula $R^6.CO.NR^7.R^8$ where $R^6$ is a hydrogen atom or an alkyl group containing 1 to 5 carbon atoms and $R^7$ and $R^8$, which may be the same or different, are each a hydrogen atom or an alkyl group containing 1 to 5 carbon atoms, or, alternatively $R^7$ and $R^8$ together form a divalent aliphatic group which, together with the adjacent nitrogen atom, forms a heterocyclic ring. Examples of amides of this type are N,N-dimethylformamide, N,N-diethylformamide, N,N-dimethylacetamide, formamide, and N-methylformamide. Other solvents which may be used include N-loweralkyl pyrrolidones e.g. N-methylpyrrolidone and diloweralkyl sulphoxides e.g. dimethylsulphoxide (although the latter forms explosive mixtures with mercuric perchlorate).

Pyridine reagents, per se, may be used as the reaction medium provided they are liquid at the reaction temperature.

The reaction medium need not be liquid at room temperature. Solids may be used so long as they are liquid at the reaction temperature.

Complexes of pyridine reagents and metal salts may be used with advantage in nonaqueous media due to their generally improved solubility therein.

Organic polar media may also be particularly useful where the pyridine reagent is sparingly soluble in aqueous media.

In practice the compound (V) may be dissolved or suspended in the chosen medium containing pyridine reagent, preferably in excess for the reaction: a 1:1-mixture of pyridine reagent and the chosen polar medium is generally satisfactory. A salt (e.g. mercuric perchlorate) is added; two molecular equivalents to one of the compound (II) is satisfactory and it is generally advisable to keep this ratio below 6:1. The reaction may be carried out at about 50°.

With the 2:1-ratio mentioned above, most of the mercury is precipitated, and further steps (e.g. passage of hydrogen sulphide) for its removal may be avoided. The pyridinium derivative may be extracted in a fairly pure state with water and excess pyridine reagent is removed by re-extraction, e.g. with methylene dichloride. Ionic impurities may be removed from the aqueous phase with suitable exchangers; evaporation then leaves the betaine as a residue or it may be precipitated as a salt by the addition of an acid, e.g. nitric or perchloric acid, as described in British application No. 43,441/63.

In order that the invention may be well understood the following examples are given by way of illustration only. In the examples the compounds are named by reference to the substance cepham, viz.:

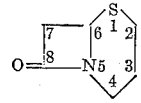

*Preparations 1–11a.*—Preparation of thio-acids and their sodium salts.

*Method A.*—From the acid chlorides by the method described for thiobenzoic acid (Organic Synthesis, 1952, 32, 101), thioanisic acid (Block and Bergmann, Ber. 1920, 53, 975); p-nitrothiobenzoic acid (Khaletskii and Yanovitskaya, J. Gen. Chem. USSR., 1949, 19, 1193; C.A. 1950, 44, 2952); 2-thiofuroic acid (Patton, J. Amer. Chem. Soc., 1949, 71, 3571); thionicotinic acid (Bohm and Michaloki, Roczniki Chem., 1954, 28, 501).

*Method B.*—From the mixed anhydride with ethyl chloroformate as described by Cronyn and Jui (J. Amer. Chem. Soc., 1952, 74, 4726).

The properties of the thio-acids or salts thereof are summarized in Table I.

reaction at lower pH, e.g., 4.5 to 5. In these examples phosphoric acid was added slowly to the reaction mixture

TABLE I

| Prep. No. | Formula | Method | M.P. | λ max., mμ | ε | Found | | | | Empirical Formula | Requires | | | |
|---|---|---|---|---|---|---|---|---|---|---|---|---|---|---|
| | | | | | | C | H | N | S | | C | H | N | S |
| 1 | p-CH$_3$O·C$_6$H$_4$COSNa | A | -------- | 261<br>293 | 9,930<br>11,500 | 50.4 | 3.9 | ------ | 16.4 | C$_8$H$_7$O$_2$SNa | 50.5 | 3.7 | ------ | 16.9 |
| 2 | p-CN·C$_6$H$_4$COSH | A | -------- | 245<br>290–1 | 17,200<br>6,460 | 59.2 | 3.2 | 8.9 | 19.1 | C$_8$H$_5$NOS | 58.9 | 3.1 | 8.6 | 19.7 |
| 3 | p-CN—C$_6$H$_4$COSNa | A | -------- | 243<br>290 | 17,350<br>6,750 | 47.2 | 2.3 | 7.3 | 16.3 | C$_8$H$_4$NOSNa·H$_2$O | 47.3 | 3.0 | 6.9 | 15.8 |
| 4 | o-NO$_2$·C$_6$H$_4$COSNa | A | 90–1 | 249 | 13,070 | 39.5 | 2.4 | 7.0 | 14.8 | C$_7$H$_4$NO$_3$SNa·½H$_2$O | 39.25 | 2.35 | 6.5 | 15.0 |
| 5 | o-CH$_3$O·C$_6$H$_4$COSNa | A | 174–5 | 259 | 6,350 | 49.4 | 4.0 | ------ | 16.3 | C$_8$H$_7$NaO$_2$S·¼H$_2$O | 49.4 | 3.9 | ------ | 16.5 |
| 6 | o-CH$_3$S·C$_6$H$_4$COSNa | A | -------- | 258–9 | 9,800 | 47.0 | 3.5 | ------ | 30.8 | C$_8$H$_7$OS$_2$Na | 46.6 | 3.4 | ------ | 31.1 |
| 7 | (pyridyl)—COSH | B | 130–1 | 263–4<br>311–3 | 6,180<br>4,000 | 51.8 | 3.9 | 10.4 | 22.9 | C$_6$H$_5$NOS | 51.8 | 3.6 | 10.1 | 23.0 |
| 8 | (thienyl)—COSNa | A | -------- | 258<br>308 | 9,750<br>8,300 | 34.5 | 2.3 | ------ | 34.5 | C$_5$H$_3$OS$_2$Na·½H$_2$O | 34.3 | 2.3 | ------ | 36.6 |
| 9 | (furyl)—COSNa | A | -------- | 260–1<br>300 | 8,080<br>11,600 | 38.3 | 2.8 | ------ | 18.1 | C$_5$H$_3$O$_2$SNa·½H$_2$O | 37.7 | 2.5 | ------ | 20.1 |
| 10 | (quinolinyl)—COSH | B | 162 | 239–40<br>281–2 | 31,600<br>7,100 | 53.0 | 4.0 | 7.8 | 16.4 | C$_{10}$H$_7$NOS | 63.4 | 3.7 | 7.4 | 16.9 |
| 11 | (thienyl)—CH$_2$COSNa | A | -------- | 239 | 14,200 | ------ | ------ | ------ | ------ | C$_6$H$_5$OS$_2$Na | ------ | ------ | ------ | ------ |
| 11a | (pyridyl)—COSH | B | 160 | 271–3<br>305 inf. | 5,000<br>3,060 | 51.8 | 3.7 | 9.8 | 22.6 | C$_6$H$_5$NOS | 51.8 | 3.6 | 10.1 | 23.0 |

*Preparation 12.—3-picolinoylthiomethyl-7-(2'-thienyl-acetamido)-ceph-3-em-4-oic acid*

(a) Thiopicolinic acid (13.9 g., 100 mmoles) was dissolved in water (250 ml.) containing sodium bicarbonate (8.4 g., 100 mmoles) and the resulting solution was added to sodium 7-2'-thienylacetamidocephalosporanate (20.9 g.) in water (250 ml.). The solution was heated at 50° for 29 hrs. under nitrogen. The mixture was cooled and the off-white solid collected by filtration and dried to give the crude sodium salt (11.6 g., 46.7%). This material in a mixture of acetone (290 ml.) and water (290 ml.) was shaken with ethyl acetate (500 ml.) and acidified with 2N-hydrochloric acid (12.5 ml.). The aqueous layer (pH ca. 2) was re-extracted with ethyl acetate (2 x 250 ml.). The combined extracts were washed successively with 10%-sodium chloride (250 ml.) and water (2 x 250 ml.), and dried (Na$_2$SO$_4$). Evaporation to ca. 50 ml., gave a white crystalline solid (10.44 g., 43.9%), [α]$_D^{28}$ −78.6° (c. 0.85 in dioxan), λ max. (H$_2$O) 274–276 mμ (ε 17,500) and 232 mμ (21,700). (Found: C, 50.8; H, 3.65. C$_{20}$H$_{17}$N$_3$O$_5$S$_3$ requires C, 50.5; H, 3.6%.) This material gave satisfactory infrared and proton magnetic resonance spectra and showed only one spot when subjected to paper chromatography with an ethyl acetate:n-butanol:0.1 M-sodium acetate (pH 5.0) (8:1:8) system, with Whatman No. 1 paper buffered with 0.1 M-sodium acetate at pH 5.0.

Yields of 59–63% were obtained by carrying out the reaction at lower pH, e.g., 4.5 to 5. In these examples phosphoric acid was added slowly to the reaction mixture (containing disodium hydrogen phosphate) until the required pH was achieved.

Still higher yields may be obtained by operating at a higher temperature and for a shorter time than above and also by operating at a pH of 3.6 to 4.6, being the natural pH obtained by using a solution of thiopicolinic acid with sodium-7-(2'-thienylacetamido) - cephalosporanate. This is shown in Preparation 12(b).

(b) Thiopicolinic acid (6.8 g.) was dissolved in water (150 ml.) at 75° with stirring. Sodium 7-(2'-thienyl-acetamido)-cephalosporanate (9.93 g.) was added and the mixture (pH=3.6) was stirred at 75° for 2 hours. The thick suspension (pH=4.6) was cooled, stirred at 5° for 1 hour and then filtered. The damp solid was dissolved in a mixture of acetone (240 ml.) and water (80 ml.) at 40°, and concentrated hydrochloric acid (8.5 ml.) was added.

Water (400 ml.) was slowly added and the mixture was cooled to 5°, stirred for 2 hours and filtered. The filter cake was washed with water (25 ml.) and dried at 40° overnight under vacuum. The yield of 3-picolinoylthio-methyl-7-(2'-thienylacetamido)-ceph-3-em-4-oic acid was 83.5% of theory (9.42 g.), [α]$_D$ −79.8° (c. 0.8 in dioxan).

The results of Preparation 12(a) and further preparations of compounds of Formula V (R$^1$=thienyl-2-acetyl) conducted in like manner are summarized in Tables IIa and IIb.

TABLE IIa

| Prep. No. | S.Y=(Formula V) | X=(Formula V) | Temp., °C. | Time, hr. | Isolation* | $[\alpha]_D$† | $\lambda_{max}$‡, m$\mu$ | $\epsilon$‡ | $\lambda_{max.}$‡, m$\mu$ | $\epsilon$‡ |
|---|---|---|---|---|---|---|---|---|---|---|
| 12(a) | —SCO—(pyridyl) | H | 50 | 29 | A, B | −79° | 274–6 | 17,500 | 232 | 21,700 |
| 13 | —SCO—C₆H₄—OMe | H | 50 | 32 | A | −114° | 289 | 26,100 | 239 | 16,200 |
| 14 | —SCO—C₆H₄—NO₂ | H | 46 | 15.5 | A | −140° | 268–9 | 21,400 | 242–3 | 19,100 |
| 15 | —SCO—C₆H₄—CN | H | 37 | 140 | A | −147° | 276–7 | 20,600 | 243–4 | 30,600 |
| 16 | —SCO—C₆H₄(NO₂) | {Na / H} | 50 | 42.5 | A | { −24° / −147° } | 266 / 266 | 18,600 / 19,800 | 232–5 / 232–5 | 21,000 / 22,500 |
| 17 | —SCO—C₆H₄(CH₃S) | H | 50 | 30 | A | −201° | 234–5 | 31,300 | 273–4 | 17,500 |
| 18 | —S—CO—C₆H₄(CH₃O) | H | 50 | 30 | A | −48° | 271–3 | 13,600 | 238–9 | 19,000 |
| 19 | —SCO—(thienyl, S) | H | 50 | 26 | A | −150° | 295–7 | 16,700 | 241–3 | 17,500 |
| 20 | —SCO—(furyl, O) | H | 50 | 26 | A | −103° | 292 | 22,700 | 232–8 | 15,600 |
| 21 | —SCO—(quinolyl) | H | 50 | 29 | A | −22.5° | 269–74 | 16,700 | 243–4 | 51,200 |
| 22 | —SCOCH₂—(thienyl) | H₃N⁺—C₆H₅ | 50 | 31 | C | ——— | 263(Sh) | 12,900 | 236 | 24,100 |
| 23 | —SCS—C₆H₅ | {Na / H} | 50 | 21.5 | A | { −274° / −333° } | 298–301 / 296–302 | 16,000 / 15,300 | 229–232 / 229–232 | 19,400 / 18,700 |
| 24 | —SSO₂—C₆H₄—CH₃ | H | 52 | 23 | D | −18° | 270 | 11,700 | 227–8 | 20,200 |
| 25 | —S.CO.(CH₂)₂CH₃ | K | 50 | 16 | B | +3° | 260–263 | 10,500 | 236–7 | 16,000 |
| 26 | —S—(4-CH₃-pyrimidyl) | H | 100 | 20 min. | E | −88° | 266(Sh) | 18,400 | 240 | 22,400 |
| 27 | —S—(4,6-(CH₃)₂-pyrimidyl) | H | 100 | 25 min. | E | −72° | 262(Sh) | 18,100 | 240–1 | 21,200 |
| 28 | —S—(pyrimidyl) | H | 100 | 25 min. | E | −114° | 260(Sh) | 17,800 | 241–2 | 21,600 |
| 29 | —SCO—(pyridyl) | H | 50 | 29 | A, B | −87 | 273 | 17,800 | 231 | 21,000 |
| 30 | —SCO—(pyridyl) | H | 60 | 15.5 | A | −82 | 273–4 | 16,400 | | |

*Methods of isolation:
  A—Insoluble sodium salts formed and either purified as such or converted to the free acid as in the example.
  B—Best yields obtained by carrying out the nucleophilic displacement at pH 5.0.
  C—Purified via the cyclohexylamine salt.
  D—Crude reaction mixture acidified and purified as free acid.
  E—ca. 50% of the isolated product was precipitated during the reaction or on cooling to 0° at the end of the reaction. The remainder was isolated by acidification of the mother liquor and purified by reprecipitation with acid from neutral solution and finally from organic solvents by addition of water.

†Optical rotations are for dioxan (c., 1%), except for the sodium salt 16, which was determined in EtOH—H₂O (2:1), the sodium salt 23 and the acids 18, 24, 29 and 30 determined in dimethylsulphoxide, and the potassium salt 25, determined in acetone-water (1:1).

‡Ultraviolet absorptions are for solutions in 0.1 M phosphate buffer adjusted to pH 6.0, except for compound 12, which was determined in water and for compounds 18, and 21 which were determined in ethanol.

TABLE IIb

| Prep. No. | Found[p] C | H | N | S | Formula | Requires C | H | N | S |
|---|---|---|---|---|---|---|---|---|---|
| 12(a) | 51.45 | 3.8 | --- | --- | $C_{20}H_{17}N_3O_5S_3$ | 50.5 | 3.6 | --- | --- |
| 13 | 53.6 | 4.85 | 4.9 | 17.1 | $C_{22}H_{20}N_2O_6S_3 \cdot C_3H_7OH$ (cryst. from propanol) | 53.2 | 5.0 | 5.0 | 17.0 |
| 14 | 48.6 | 3.6 | 8.2 | 18.6 | $C_{21}H_{17}N_3O_7S_3$ | 48.5 | 3.3 | 8.1 | 18.5 |
| 15 | 53.7 | 3.6 | 8.2 | 19.3 | $C_{22}H_{17}N_3O_5S_3$ | 52.9 | 3.4 | 8.4 | 19.3 |
| 16 | 47.7 | 3.7 | 7.9 | 17.7 | $C_{21}H_{16}N_3O_7S_3Na$ | 46.6 | 3.0 | 7.8 | 17.8 |
|  | 47.6 | 3.5 | 8.4 | 17.8 | $C_{21}H_{17}N_3O_7S_3 \cdot \tfrac{1}{2}H_2O$ | 47.75 | 3.4 | 8.0 | 18.2 |
| 17 | 49.7 | 4.2 | 5.2 | 24.2 | $C_{22}H_{20}N_2O_5S_4$ | 49.9 | 4.0 | 5.3 | 24.2 |
| 18 | 51.9 | 4.1 | 5.8 | 18.7 | $C_{22}H_{20}N_2O_6S_3$ | 52.4 | 4.0 | 5.55 | 19.1 |
| 19 | 47.75 | 3.7 | 5.7 | 26.0 | $C_{19}H_{16}N_2O_5S_4$ | 47.5 | 3.4 | 5.8 | 26.7 |
| 20 | 48.8 | 3.9 | 5.7 | 20.0 | $C_{19}H_{16}N_2O_6S_3$ | 49.1 | 3.5 | 6.0 | 20.7 |
| 21 | 55.7 | 3.9 | 7.8 | 18.0 | $C_{24}H_{19}N_3O_5S_3$ | 54.9 | 3.6 | 8.0 | 18.3 |
| 22 | 52.4 | 5.4 | 6.8 | 21.0 | $C_{26}H_{31}N_3O_5S_4$ | 52.6 | 5.3 | 7.1 | 21.6 |
| 23 | 48.1 | 3.6 | 5.7 | 27.8 | $C_{21}H_{17}N_2O_4S_4Na$ | 49.2 | 3.3 | 5.5 | 25.0 |
| 24 | 47.2 | 3.9 | 5.75 | 23.5 | $C_{21}H_{20}N_2O_6S_3 \cdot \tfrac{1}{2}H_2O$ | 47.3 | 3.9 | 5.3 | 24.0 |
| 25 | --- | --- | --- | --- |  | --- | --- | --- | --- |
| 26 | 49.6 | 4.3 | 11.9 | 20.7 | $C_{19}H_{18}N_4S_3O_4$ | 49.4 | 3.9 | 12.1 | 20.8 |
| 27 | 49.3 | 4.5 | 12.0 | 19.8 | $C_{20}H_{20}N_4S_3O_4 \cdot \tfrac{1}{2}H_2O$ | 49.5 | 4.3 | 11.5 | 19.8 |
| 28 | 49.6 | 3.9 | 11.5 | 20.1 | $C_{18}H_{16}N_4S_3O_4 \cdot \tfrac{1}{2}C_4H_8O_2$ (cryst. from aqueous dioxan) | 48.9 | 3.9 | 11.4 | 19.5 |
| 29 | 51.1 | 3.6 | 8.5 | 19.7 | $C_{20}H_{17}N_3O_5S_3 \cdot \tfrac{1}{3}C_3H_6O$ [a] | 51.0 | 3.9 | 8.5 | 19.4 |
| 30 | 50.8 | 3.8 | 8.6 | 19.7 | $C_{20}H_{17}N_3O_5S_3$ | 50.5 | 3.6 | 8.8 | 20.2 |

[a] Crystallised from aqueous acetone.
[p] Infrared spectra (Nujol) and proton magnetic resonance spectra (pyridine) of each compound were consistent with the indicated structure.

Compounds of the type

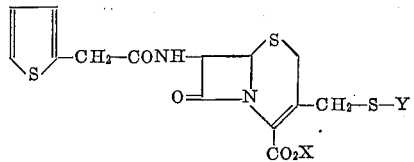

from Tables IIa and IIb were subjected to reaction promoted by mercuric compounds in a water-pyridine (1:1 by vol.) medium at 50° along the general lines disclosed in Example 23. The results are shown in Table III.

TABLE III

| Ex. No. | Group—S.Y | Promoter | Moles Promoter/ Moles Substrate | Time for max. Yield | Yield, percent | U.V. ratio |
|---|---|---|---|---|---|---|
| 1 | —S.CO—⟨C₆H₄⟩—OMe | $Hg(OAc)_2$ | 2.0 | 1.5 hour | 47 | 1.11 |
| 2 | —S.CO—⟨C₆H₄⟩—NO₂ | $Hg(OAc)_2$ | 2.0 | 6–7 hour | 28 | --- |
| 3 | —S.CO—⟨pyridyl-N⟩ | $Hg(NO_3)_2$ | 2.5 | 5 min | 70 | 1.08 |
| 4 | —S.CO—⟨pyridyl-N⟩‡ | $Hg(ClO_4)_2$ | 2.5 | 30 min | 86 | 1.02 |
| 5 | —S.CO—⟨furyl-O⟩ | $Hg(ClO_4)_2$ | 2.5 | 45 min | 74 | 1.10 |
| 6 | —S.CO—⟨thienyl-S⟩ | $Hg(ClO_4)_2$ | 2.5 | 45 min | 50 | 1.10 |
| 7 | —S.CS—⟨C₆H₅⟩ | $Hg(ClO_4)_2$ | 2.5 | 1 hour† | >52 | 1.11 |
| 8 | —S.CO—⟨C₆H₄⟩—CN | $Hg(ClO_4)_2$ | 2.5 | 1 hour† | >67.5 | 1.06 |
| 9 | —S.C₂H₅ | $Hg(NO_3)_2$ | 2.5 | 1 hour | 44.0 | 1.10 |
| 10 | —S.SO₂—⟨C₆H₄⟩—CH₃ | $Hg(NO_3)_2$ | 2.5 | 1 hour | 63 | 1.10 |
| 11 | —S.C⟨benzothiazolyl⟩ | $Hg(ClO_4)_2$ | 2.5 | 30 min | 55.4 | *1.09 |

TABLE III—Continued

| Ex. No. | Group—S.Y | Promoter | Moles Promoter/ Moles Substrate | Time for max. Yield | Yield, percent | U.V. ratio |
|---|---|---|---|---|---|---|
| 12 | —S.SO$_3^-$ | Hg(SCN)$_2$ | 3.0 | 120 min | 57 | 1.11 |
| 12 | —S.SO$_3^-$ | Hg(OAc)$_2$ | 3.0 | 60 min | 55 | 1.11 |
| 12 | —S.SO$_3^-$ | Hg(NO$_3$)$_2$ | 3.0 | 30 min | 64 | 1.10 |
| 12 | —S.SO$_3^-$ | Hg(ClO$_4$)$_2$ | 2.5 | 10 min | 73 | 1.08 |
| 13 | —S.COCH$_2$CH$_2$CH$_3$ | Hg(ClO$_4$)$_2$ | 3.0 | 15 min | 60 | 1.07 |
| 14 | —S—(dimethylpyrazine) | Hg(NO$_3$)$_2$ | 2.5 | 35 min | 63 | 1.04 |
| 15 | —SCO—C$_6$H$_4$—NO$_2$ | Hg(ClO$_4$)$_2$ | 2.5 | 4 hour | 55 | 1.11 |
| 16 | —SCO—C$_6$H$_4$(NO$_2$) | Hg(ClO$_4$)$_2$ | 2.5 | 4 hour | 30 | 1.07 |
| 17 | —SCO—C$_6$H$_4$(SCH$_3$) | Hg(ClO$_4$)$_2$ | 2.5 | 2 hour | 51.5 | 1.10 |
| 18 | —SCO—C$_6$H$_4$(SCH$_3$) | Hg(ClO$_4$)$_2$ | 3.5 | 2.75 hr | 60 | 1.10 |
| 19 | —SCO—(quinoline) | Hg(ClO$_4$)$_2$ | 2.5 | >1 hour† | 70 | |
| 20 | —SCOCH$_2$—(thiophene) | Hg(ClO$_4$)$_2$ | 2.5 | 10 min | 10 min.. 63 | 1.15 |
| 21 | —S—CO—C$_6$H$_4$(CH$_3$O) | Hg(ClO$_4$)$_2$ | 2.5 | 1 hour | 66 | 1.09 |
| 22 | —S—CO—C$_6$H$_5$ | AgNO$_3$ | 2.5 | 2 hour | 54 | |
| 22a | —S—CO—(pyridyl)‡ | Hg(ClO$_4$)$_2$ | 2.5 | 1 hour | 20 | |
| 22b | —S.CO—(pyridyl N)‡ | Hg(ClO$_4$)$_2$ | 2.5 | 45 min | 73 | |

‡This experiment was run at 25° C.
†Assay figures still increasing at 1 hour.
*Experiment run at 35°.

*Example 23*

N-(7-2'-thienylacetamidoceph - 3 - em-3-ylmethyl)pyridinium-4-carboxylate from 3-benzoylthiomethyl-7-(2'-thienylacetamido)-ceph-3-em-4-oic acid, using mercuric perchlorate.—The thiobenzoate (9.492 g.) was dissolved in pyridine (100 ml.) at 51°, and water (25 ml.), mercuric perchlorate solution (50 ml.) [prepared by suspending yellow mercuric oxide (0.25 mole) in water (100 ml.) and adding perchloric acid (0.52 mole), stirring, and filtering, and making up to 250 ml. in water] and water (25 ml.) were added successively with stirring (a black precipitate started to form in a few minutes). The reaction continued for 25 min., when the flask was transferred to a rotary evaporator and the mixture was evaporated (water pump) at 50–53° for 20 min. Water (150 ml.) was added and hydrogen sulphide was passed into the suspension for 20 min. The black suspension was transferred to the top of a column (internal diameter 5.4 cm.) containing an intimate mixture of Dowex-1 (OAc⁻) (150 ml.) and Deacidite FF (OAc⁻) (150 ml.) above Zeo-Karb 226 SRC 47 (H⁺) (50 ml.) (all resins of mesh size 100–200). Elution with water gave 1560 ml. which was freeze-dried to give a cream solid. Further elution with water gave 220 ml., which was filtered and concentrated to 25 ml. by rotary evaporation at 30° and then used to dissolve the freeze-dried material. The resulting solution was filtered and treated with nitric acid (s.g. 1.42; 1.0 ml.) with stirring. After 2 hr. at 5° the buff precipitate was collected by filtration and dried over P$_2$O$_5$ at room temperature and 0.5 mm. to give the nitric acid salt (5.902 g., 61.6%), λmax. (H$_2$O) 240 mμ (E$_{1\text{ cm.}}^{1\%}$ 329) and 255 mμ (E$_{1\text{ cm.}}^{1\%}$ 300)

λ max. (H$_2$O) 240 (E$_{1\text{ cm.}}^{1\%}$ 309) and 255 mμ (E$_{1\text{ cm.}}^{1\%}$ 283

Evaporation of the filtrate to ca. 5 ml. gave a second crop (0.052 g., 0.6%),

The nitric acid salt (5.742 g., 12 mmoles) was suspended in water (20 ml.) and treated dropwise with ammonia (sp. gr. 0.88) with stirring until the solid just dissolved (pH 4.0). The resulting brown solution was diluted to 45 ml. with water and passed down a column (internal diameter 2.1 cm.) containing an intimate mixture of Dowex-1 (OAc⁻) (15 ml.) and Deacidite FF (OAc⁻) (15 ml. above Zeo-Karb 226 SRC 47 (H⁺) (30 ml.) above Deacidite FF (OAc⁻) (15 ml.). Elution with water gave 568 ml., when the rotation of the eluate was negligible. This was freeze-dried to give a white solid, which was triturated with dry methanol (45 ml.) to give the pyridinium derivative (4.436 g., 89.3% recovery), $[\alpha]_D$ +47.8° (c., 1.125 in $H_2O$), $\lambda$ max. ($H_2O$) 240 $E_{1cm}^{1\%}$ 380) and $\lambda$ inf. 255 m$\mu$ ($E_{1cm}^{1\%}$ 348)

Table IV shows yields of N-(7-2'-thienyl-acetamidoceph-3-em-3-ylmethyl)pyridinium-4- carboxylate from the 3-benzoylthiomethyl - 7 - (2' - thienylacetamido)ceph-3-em-4-oic acid at 50° in 50% (v./v.) aqueous pyridine in the presence of various metallic salts.

TABLE IV

| Salt Used | Moles Catalyst/Moles thiobenzoate | Time for max. Yield | Yield, Percent | U.V. Ratio |
| --- | --- | --- | --- | --- |
| HgBr₂ | 2.0 | 4 hours | 13.9 | 1.07 |
| Hg(SCN)₂ | 2.0 | 1–4 hours | 31.4 | 1.11 |
| Hg(ClO₄)₂ | 2.0 | 0.75 hour | 58 | 1.10 |
| Hg(ClO₄)₂ | 2.5 | 25 min | 74.0 | 1.11 |
| Hg(OCOCF₃)₂ | 2.0 | 2.5–3 hrs | 60 | 1.13 |
| Hg₃(PO₄)₂ | 2.0 | None | (ᵃ) | |
| Hg(OCOC₆H₅)₂ | 2.0 | 3–5 hrs | ~25 | 1.09 |

ᵃ Formed.

*Example 24*

*Preparation of N-(7-2'-thienylacetamidoceph-3-em-3-ylmethyl)pyridinium - 4 - carboxylate from 2" - (7 - 2'-thienyl - acetamido - 4 - carboxyceph - 3 - em - 3 - ylmethylthio)4"-methylpyrimidine.*—The mercaptopyrimidine derivative (4.98 g.) was dissolved in pyridine (40 ml.) at 51°; a solution of mercuric acetate (7.70 g., 2.25 equiv.) in aqueous pyridine (25 ml.+10 ml.) was added rapidly and washed down with water (25 ml.). The solution darkened rapidly and precipitation of a fine black solid eventually began.

The mixture was stirred vigorously for an hour, when the flask was transferred to a rotary evaporator and the solvents were removed under reduced pressure at 50° during 25 min. Water (10 ml.) was added and re-evaporated during a further 10 min.

The residue was slurried with water (50 ml.) and treated with hydrogen sulphide for 15–20 min. The black suspension was carefully transferred to the top of a multiple bed ion-exchange resin column, comprising beds of Zeo-karb 226, SRC 47 (H⁺) (25 ml.), Dowex-1 (OAc⁻) (50 ml.) and Deacidite FF (OAc⁻) (50 ml.) (all mesh size 100–200) wet packed in that order with each bed separated by filter paper. Elution with water gave a yellow eluate which was freeze-dried to a yellow solid.

On treatment with water (ca. 20 ml.) this solid was only partially dissolved, leaving a pale yellow residue (0.8 g.) (subsequently shown by electrophoresis, chromatography, U.V. and I.R. spectra to be 2-mercapto-4-methylpyrimidine). This was eliminated by filtration, and the orange solution was treated with concentrated nitric acid (0.8 ml., s. gr. 1.42), with stirring. After being chilled at 0° the precipitated pyridinium nitrate was collected by filtration and dried over $P_2O_5$ in vacuo (2.73 g., 53.3%), $\lambda$ max. ($H_2O$) 240 m$\mu$ ($E_{1cm}^{1\%}$ 315), 255 m$\mu$ ($E_{1cm}^{1\%}$ 282)

The nitrate (1.0 g.) was suspended in aqueous acetone (25 ml.) and neutralised with 2 N-ammonia solution. A dirty yellow residue was removed by filtration and the resulting pale yellow solution was applied to a column (10 ml.) of Dowex-1 (OAc⁻) (100–200 mesh) and eluted with water. The almost colourless eluates were collected and freeze-dried in batches. Trituration of the freeze-dried solids with methanol gave white powders (a small quantity of yellow colour being retained by the methanol) (0.75 g., 87% recovery; overall yield 46.4%). U.V. data on the least pure sample (1st fraction):

$\lambda$ max. ($H_2O$) 240 ($E_{1cm}^{1\%}$ 365) and $\lambda$ (inflexion) 255 m$\mu$ ($E_{1cm}^{1\%}$ 333)

Table V contains the results of similar experiments in which 2"-(7-2'-thienylacetamido-4-carboxy-ceph-3-em-3-ylmethylthio)-4"-methylpyrimidine has been converted into N-(7 - 2' - thienylacetamidoceph - 3 - em - 3 - ylmethyl)pyridinium-4-carboxylate in the presence of various mercuric salts.

TABLE V

| Salt used | Temperature,° C. | Proportion: of pyridine water | Time to optimum Yield, min. | Optimum Yield, percent |
| --- | --- | --- | --- | --- |
| HgBr₂ | 50 | 50:50 | 360 | ᵃ 25 |
| Hg(O.COCH₃)₂ | 50 | 50:50 | 60 | 50 |
| Hg(NO₃)₂ | 50 | 50:50 | 15 | 68 |
| Hg(NO₃)₂ | 50 | 50:50 | 45 | ᵇ 61 |
| Hg(ClO₄)₂ | 50 | 50:50 | 10 | 70 |
| Hg(ClO₄)₂ | 35 | 50:50 | 75 | 75 |
| Hg(ClO₄)₂ | 19 | 50:50 | 210 | 75 |
| Hg(ClO₄)₂ | 35 | 25:75 | 160 | 82 |
| Hg(ClO₄)₂ | 35 | 10:90 | 90 | ᵃ 42 |

ᵃOptimum yields not attained within the time of the reaction, but yield-time curves are levelling out at this stage.
ᵇ1.25 equivalents of mercuric nitrate used.

*Example 25*

*N - (7 - 2' - thienylacetamidoceph - 3 - em - 3 - ylmethyl)pyridinium - 4 - carboxylate, via S - (7 - 2' - thienylacetamidoceph - 3 - em - 3 - ylmethyl)thiosulphate, from sodium 7 - (2' - thienylacetamido)cephalosporanate.*—Sodium 7 - (2' - thienylacetamido)cephalosporanate (4.18 g.:10 mmoles) was dissolved in water (28 ml.) and gave a clear solution, pH 5.8. To this was added sodium thiosulphate pentahydrate (2.73 g.:11 mmoles) in water (7 ml.) and themixture made up to 60 ml. before being transferred to a vessel at 90°. Ammonium thiosulphate may be used instead of the sodium salt. The reaction was carried out at this temperature for 30 minutes with vigorous stirring, under nitrogen; or the reaction may be carried out at 37° for 64 hr., or at 50° for 40 hr. The solution was then cooled to 27° and pyridine (80 ml.) added; mercuric perchlorate solution (22 ml. of M-solution:22 mmoles) (or a 4 M-solution may be used) was added dropwise with stirring so that the temperature did not exceed 25°. The addition required 7 minutes and the mixture was stirred for a further 53 minutes at 25°; in other reactions this stage was carried out in 25 minutes at 50°.

The green solution was cooled to ~10° in ice and treated with hydrogen sulphide for 7 minutes. The precipitated mercuric sulphide was removed on a kieselguhr bed and thoroughly washed with water; the filtrate was extracted with Amberlite LA-1 (40 ml.) in benzene (100 ml.), Amberlite LA-1 (20 ml.) in benzene (50 ml.) and with methylene chloride (2 x 100 ml.). (LA stands for liquid anion-exchanger.) The organic extracts were back-extracted with water (50 ml.). The combined aqueous solutions were rotary-evaporated at 30° for ½ hour to remove dissolved organic solvents, before being transferred to a column consisting of Woelm acidic alumina (25 ml.) over Dowex-1 (acetate form) (50 ml.), over Zeo-Karb 226 (hydrogen form) (10 ml.). Elution with water was carried out until rotation (1-dm. tube) was less than 0.02°; the total eluate was then freeze-dried.

The residue was dissolved in water (40 ml.) and treated with nitric acid (c. nitric acid: water=1:1) until the pH dropped to 1.5. The mixture was cooled to 0° for 1 hour, after which the hydronitrate was filtered off and washed with water. The product was dried in vacuo over $P_2O_5$. A second crop of product was obtained from the mother liquor. Yield: 2.12 g. (44.5%), $\lambda$ (inflexion) 238–240 m$\mu$ ($E_{1 cm.}^{1\%}$ 320), $\lambda$ max. 255 m$\mu$ $E_{1 cm.}^{1\%}$ 289)

$[\alpha]_D^{23}$ +40°. (pH 6 phosphate buffer: C=0.98.) This product may also be isolated by the method described in Example 23 for the thiobenzoate.

A sample of the above hydronitrate (1 g.) was suspended in water (10 ml.), and brought into solution by raising pH to 5.0 with 7.5 N-ammonia solution. The mixture was eluted from a Dowex-1 (acetate cycle) column (15 ml.), until the rotation of the eluate was <0.02° (1-dm. tube). The eluate was freeze-dried and the residue precipitated from methanol (20 ml.) to give a white solid (0.775 g.: 90% from the hydronitrate), $\lambda$ (inflexion) 240 m$\mu$ ($E_{1 cm.}^{1\%}$ 372), $\lambda$ max. 255 m$\mu$ ($E_{1 cm.}^{1\%}$ 341)

$[\alpha]_D^{23}$=+47.5° (water, C=0.965). Overall yield=40%.

*Example 26*

(a) *3-benzoylthiomethyl-7-(2'-thienylacetamido)ceph-3-em-4-oic acid.*—Sodium 7-(2'-thienylacetamido)cephalosporanate (4.27 kg.), sodium thiobenzoate solution (40% w./v.; 5.35 l.), sodium dihydrogen orthophosphate dihydrate (1.88 kg.), orthophosphoric acid (7.27 ml.), and water (27.8 litres) were heated together at 90° with stirring for 1 hr. The controlled pH of the reaction mixture was 4.5 at the start rising to 5.2 at the finish of the reaction. The reaction mixture was cooled to 10° for 30 mins. and the crystalline sodium 3-(benzolythiomethyl)-7-(2'-thienylacetamido)ceph-3-em-4-oate filtered off.

The crude product was dissolved in a mixture of acetone (125 litres) and water (125 litres) at 35° and stirred while concentrated hydrochloric acid (3.5 litres) was slowly added and the mixture cooled to −5° overnight. The crystalline material was filtered off, washed with water and dried at 40° overnight in vacuum to give 3-benzoylthiomethyl-7 - (2'-thienylacetamido)ceph-3-em-4-oic acid (4.047 kg., 83.5%), $[\alpha]_D$ −131° (c., 1 in dioxan), $\lambda$ max. 237–238, 272–275 m$\mu$ ($E_{1 cm.}^{1\%}$ 481 and 372 respectively) identified by its infrared spectrum.

(b) *N-(7-2' - thienylacetamidoceph - 3-em-3-ylmethyl) pyridinium-4-carboxylate.*—The thiobenzoate (23.73 g.) was dissolved in pyridine (125 ml.) and the resulting solution was warmed to 51°. Mercuric perchlorate solution (125 ml.) [prepared by suspending yellow mercuric oxide (54.15 g., 0.25 mole) in water (100 ml.), adding perchloric acid (S.G. 1.54; 55.5 ml.; 0.52 mole), stirring, filtering, and making up to 250 ml. with water] was added, and the mixture was stirred at 51° for 50 minutes. The mixture was cooled to 0°, thiobenzoic acid (50 ml.) was added, and stirring was continued for 10 minutes. The solution was filtered through a kieselguhr bed, and extracted successively with benzene (300 ml.), with a solution of Amberlite LA 2 anion exchanger (150 ml.) in benzene (300 ml.), with a solution of LA 2 (50 ml.) in benzene (100 ml.) and with benzene (100 ml.). The precipitate was washed with water (2 x 100 ml.) and the washings used to back-extract the organic layers twice.

The solution and back-extracts were transferred successively to the top of a column (internal diameter 6.5 cm.) containing alumnia (Woelm acid, activity 1; 150 ml.) over Zeo-Karb 22) SRC 43 (H+) (25 ml.) (mesh size 100-200), over alumina (Woelm acid, activity 1, 150 ml.), over Sephadex CM C-25 (medium) (H+) (25 ml.). Elution with water until the effluent had $\alpha$=0.08° (1 dm. tube) gave 950 ml., which was treated with 4 N-nitric acid (125 ml.), then kept at 0° for 2 hours. The crystalline precipitate was filtered off, washed with water (25 ml.) and acetone (300 ml.) and dried in vacuo at 40° for 3 hrs. to give the hydronitrate salt (15.63 g., 65.4%), $[\alpha]_D$ (pH 7 phosphate buffer) +42.3° (c., 1.20)

$\lambda$ max. (pH 7 buffer) 239 m$\mu$ ($E_{1 cm.}^{1\%}$ 231), $\lambda$ inf. 255 m$\mu$ ($E_{1 cm.}^{1\%}$ 294), water (Karl Fischer) 2.7%, mercury content <10 p.p.m.

The hydronitrate salt (9.561 g., 20 mmoles) was suspended in water (66.0 ml.) and shaken with a solution of Amberlite LA 2 (10.0 ml.) in petroleum ether (B.P. 40–60°; 60 ml.). The aqueous layer was extracted successively with LA 2 (2 ml.) in petroleum ether (25 ml.), with LA 2 (2 ml.) in petroleum ether (25 ml.) and with petroleum ether (2 x 25 ml.). The organic layers were back-extracted successively with water (20 ml. and 10 ml.) and the solution and extracts passed down a column of Dowex-1 resin (OAc form; 18 ml., 100–200 mesh), over Sephadex CM C–25 (medium) (18 ml.). Elution with water gave 170 ml. when the rotation of the eluate was negligible. This solution was freeze-dried to give a white solid, which was triturated with dry methanol (90 ml.), then kept at 0° for 2 hours. The solid was filtered off, washed with methanol (40 ml.) and dried in vacuo overnight at room temperature to give the pyridinium derivative (7.304 g., 88.0% yield), $[\alpha]_D$ +48.1° (c., 1.03 $H_2O$)

$\lambda$ max. ($H_2O$) 239 m$\mu$ ($E_{1 cm.}^{1\%}$ 333), $\lambda$ inf. 255 m$\mu$ $E_{1 cm.}^{1\%}$ 352)

moisture (Karl Fischer) 0.7%, mercury content <10 p.p.m., Lovibond colour (10% solution, 2 cm. cell) 0.8Y, 0.2R.

*Example 27(a)*

*3-benzoylthiomethyl-7 - (2'-thienylacetamido) - ceph-3-em-4-oic acid.*—7-thienylacetamidocephalosporanic acid (4.975 g., 12.5 mmoles), sodium bicarbonate (1.05 g., 12.5 mmoles), and sodium thiobenzoate (4.0 g., 25 mmoles) were dissolved in water (125 ml.). The solution was filtered and the filtrate was heated at 50° for 18 hrs. in a stream of nitrogen. The crystalline precipitate was collected, washed with water and dried in vacuo over $P_2O_5$ to give sodium 3-benzoylthiomethyl-7(2'-thienylacetamido)-ceph-3-em-4-oate (4.39 g., 70.6%), $\nu$ max. (Nujol) 1758 ($\beta$-lactam), 1660 (—S—CO—), 1648, 1530 (CONH) and 1625 cm.$^{-1}$ ($CO_2^-$).

The sodium salt was suspended in 50% aq. acetone (50 ml.) and covered with ethyl acetate (100 ml.) while 2 N-hydrochloric acid was added. The mixture was shaken until nearly all the solid was dissolved. The acetone was removed in vacuo and the layers were separated. The aqueous layer was extracted with more ethyl acetate (50 ml.), the extracts were combined, washed with water and dried ($MgSO_4$). Evaporation gave a white solid (4.2 g.) which was crystallised from boiling 2:1 acetone-water (180 ml.) to give the *title compound* (1.6 g., 25.8%), $[\alpha]_D^{26}$ —138° (dioxan), λ max. (pH 6 phosphate buffer) 238–239 mμ (ε 23,500), 273–274 mμ (21,050), ν max. (Nujol) 1770 (β-lactam), 1700 (COOH), 1682 (—SCOPh), 1643, 1538 cm.$^{-1}$ (CONH). (Found: C, 53.4; H, 4.1; N, 6.1; S, 20.0. $C_{21}H_{18}N_2O_5S_3$ requires C, 53.1; H, 3.8; N, 5.9; S, 20.3%.) A second crop (2.337 g.) brought the total yield to 63.5%.

*Example 27(b)*

*Silver 3-benzoylthiomethyl - 7 - (2'-thienylacetamido)-ceph-3-em-4-oate.*—The acid (2.32 g., 4.7 mmoles) in dioxan (135 ml.) was treated with 0.2 N-silver nitrate solution. Water (110 ml.) was added and the cloudy yellow solution was stirred vigorously and treated with 0.1 N-sodium hydroxide (ca. 50 ml.) to bring the pH to 7.0. The brown precipitate was collected by filtration, washed thoroughly with water and dried in vacuo to give the *silver salt* (2.54 g.). (Found: Ag, 19.5%, $C_{21}H_{17}N_2O_5S_3Ag$ requires Ag, 18.6%.)

*Example 27(c)*

*Reaction of silver 3-benzoylthiomethyl-7-(2'-thienylacetamido)-ceph-3-em-4-oate with aqueous pyridine.*— The silver salt (0.58 g., 1 mmole) in pyridine (8 ml.) and water (8 ml.) was heated at 46° for 17 hr. The mixture was diluted with water (25 ml.), filtered through kieselguhr and washed three times with methylene chloride. The aqueous layer was freeze-dried, the brown residue was triturated with water (10 ml.) filtered and the filtrate again freeze-dried to give a pale brown solid (0.115 g.). High voltage electrophoresis indicated the presence of the pyridine derivative of 7-(2'-thienylacetamido) cephalosporanic acid.

This material in water was passed down an ion exchange column of Dowex–1 (OAc$^-$ form ca. 10 ml.) and eluates were collected until they showed negligible optical rotations. The combined eluates were freeze-dried to give a crude sample of 3-pyridinium methyl-7-(2'-thienyl-acetamido)-ceph-3-em-4-oate. Electrophoresis showed a strong spot corresponding to that shown by a pure specimen of the pyridinium compound.

A blank run with 3-benzoylthiomethyl-7-(2'-thienyl-acetamido)-ceph-3-em-4-oic acid (0.479 g., 1 mmole) heated in pyridine (8 ml.) and water (8 ml.) for 16 hr. at 46° and worked up as above showed no sign of formation of 3-pyridiniummethyl-7-(2'-thienylacetamido)-ceph-3-em-4-oate.

*Example 28*

*3 - pyridiniummethyl - 7 - (2'-thienylacetamido)-ceph-3-em-4-oate from 3-benzoylthiomethyl-7-(2'-thienylacetamido)-ceph-3-em-4-oic acid using silver nitrate.*—3-benzoylthiomethyl - 7-(2'-thienylacetamido)-ceph-3-em-4-oic acid (4.275 g., 9.0 mmoles) was dissolved in pyridine (45 ml.) and treated at 50° with silver nitrate (3.06 g., 18 mmoles) in water (45 ml.). The reaction mixture was heated at 50° for 5 hr. An aliquot taken at this time and analysed by electrophoresis and ultraviolet absorption showed the presence of 24% of the pyridinium compound. The cooled solution was diluted with water (50 ml.), extracted with methylene chloride (50 ml.) and filtered. The residue was washed with water, the organic extract was washed with water and the combined washings and aq. layer were passed through a column of Dowex I (OAc$^-$ form, 100 ml.). Elution was continued until the $\alpha_D$ fell below $+0.025°$. The volume of the combined eluates was reduced to 50 ml. by rotary evaporation at <35°. This solution was passed through a column of Dowex I (OAc$^-$ form, 40 ml.).

The eluates were freeze dried to give a brown gum (0.86 g.,) which was triturated with methanol to furnish the pyridinium compound as a buff solid (0.43 g.), λ max. (H$_2$O) 240 mμ ($E_{1cm.}^{1\%}$ 342) and 255 mμ $E_{1cm.}^{1\%}$ 309)

Further purification was achieved by ion exchange and methanol trituration to give the pyridinium compound as very pale cream crystals (0.215 g.) $[\alpha]_D$ +47.6° (C 1.04 in H$_2$O), λ max. (H$_2$O) 240 mμ ($E_{1cm.}^{1\%}$ 358) and λ inf. 255 mμ $E_{1cm.}^{1\%}$ 329)

ratio 1.09. The infrared and N.M.R. spectra confirmed the identity of this product.

*Example 29*

*3 - pyridinium-methyl-7-(2'-thienylacetamido)-ceph-3-em-4-oate from 3-benzoylthiomethyl-7-(2'-thienylacetamido)-ceph-3-em-4-oic acid using mercuric chloride.*— 3 - benzoylthiomethyl - 7 - (2'-thienylacetamido)-ceph-3-em-4-oic acid (4.745 g., 10 mmoles) in pyridine (25 ml.) was warmed in a thermostat bath at 50°, stirred and treated with a solution of mercuric chloride (5.43 g., 20 mmoles) in water (75 ml.). After 3 hr. a 10 μl. sample was taken, subjected to electrophoresis: the product spot was eluted and assessed by its ultraviolet absorption at 240 and 255 mμ (ratio 1.11). This analysis showed 30% of the required product to be present.

The grey solid was collected by filtration, and washed with water (25 ml.). The combined filtrate and washings were extracted with methylene chloride (3 x 50 ml.) and filtered. The aqueous layer was passed through a column of Dowex 1 (OAc$^-$ form, ca. 130 ml.) until the eluate had $\alpha_D$ < +0.02°. Freeze drying gave a brown gum that was dissolved in water and chromatographed on a column of Deaciditę FF (OAc$^-$ form, ca, 50 ml.). Two fractions were collected and shown to contain 96% and 88% of the required product respectively. Treatment of these fractions with methanol gave buff crystals (1.2 g. 29% yield) of the pyridinium compound, λ max. (H$_2$O) 240 mμ ($E_{1cm.}^{1\%}$ 367) and 255 mμ ($E_{1cm.}^{1\%}$ 333)

This was further purified by chromatography on Deacidite FF (OAc$^-$ form, 100 ml.) and the first brown fraction (0.37 g.) was discarded. The subsequent fractions were combined and crystallized from methanol to give the pyridinium derivative (0.52 g., 12%), $[\alpha]_D$+46°, λ max, (H$_2$O) mμ ($E_{1cm.}^{1\%}$ 356) and λ inf. 255 mμ ($E_{1cm.}^{1\%}$ 324)

ratio 1.10; the infra-red and N.M.R. spectra confirmed the identity of the product.

The methylene chloride extracts were dried, evaporated and the product was triturated with acetone to yield recovered 3-benzoylthiomethyl-7 - (2'-thienylacetamido)-ceph-3-em-4-oic acid (1.38 g., 29%) of >90% purity.

The following table summarizes maximum yields of 3-pyridiniummethyl-7 - (2'-thienylacetamido)-ceph-3-em-4-oate obtained by heating various 3-Y-S-methyl-7(2'-thienylacetamido)-ceph-3-em-4-oic acids at 50° in 50% v./v. aq. pyridine in the presence of various metallic salts. The figures were obtained by assessing the reaction mixture as follows: 10 μl. samples were subjected to electrophoresis, spots corresponding to the required pyridinium compound were cut out, eluted with water into 10 ml. flasks and their ultraviolet absorption at 240 and 250 mμ was measured. The ratio of optical densities at these wave lengths (1.10 for pure material) was used as another criterion of purity.

| Ex. | Salt Used | Moles catalyst/ mole substrate | —SY | Time for max. yield | Yield (percent) | Ratio |
|---|---|---|---|---|---|---|
|  | None | | —SCOC$_6$H$_5$ | | None formed | |
| 30 | AgNO$_3$ | 1 | —SCOC$_6$H$_5$ | >5 hr | 12 | 1.18. |
| 31 | AgNO$_3$ | 2 | —SCOC$_6$H$_5$ | 4 hr | 26.5 | 1.11. |
| 32 | AgNO$_3$ | 3 | —SCOC$_6$H$_5$ | 4.5 | 31.5 | 1.12. |
| 33 | AgClO$_4$ | 3 | —SCOC$_6$H$_5$ | 4.5 | 39 | 1.11. |
| 34 | Ag(OCOCH$_3$) | 3 | —SCOC$_6$H$_5$ | 4.5 | 38 | 1.11. |
| 35 | Hg(CN)$_2$ | 2 | —SCOC$_6$H$_5$ | | <5 | |
| 36 | HgCl$_2$ | 2 | —SCOC$_6$H$_5$ | 4.5 | 30 | 1.11. |
| 37 | HgSO$_4$ | 2 | —SCOC$_6$H$_5$ | 4.5 | 26.5 | 1.13. |
| 38 | Hg(OCOCH$_3$)$_2$ | 2 | —SCOC$_6$H$_5$ | 2–3 | 55 | 1.10. |
| 39 | Hg(NO$_3$)$_2$ | 2 | —SCOC$_6$H$_5$ | 2.5 | 53 | 1.11. |
| 40 | AgNO$_3$ | 3 | —SSO$_3$–Na$^+$ | 5 | 25 | Carried out on the 7-phenylacetamido derivative. |
| 41 | AgNO$_3$ | 3 | —S—C(NH$_2$)=NH | Not determined. | ca. 25 | Do. |
| 42 | Hg(O.COCH$_3$)$_2$ | 2.25 | —S-(pyrimidinyl)-CH$_3$ | ~1 | 51 | 1.09. |
| 43 | AgNO$_3$ | 3 | —S-(pyrimidinyl)-CH$_3$ | 2 | 28 | 1.13. |
| 44 | NaAuCl$_4$ | 2.5 | —SCOC$_6$H$_5$ | 3.5 | 30 | 1.09. |
| 45 | NaAuCl$_4$ | 2.5 | —SCO-(pyridyl) | 1.5 | 38 | Yield corr. for presence of thiopicolinic acid. |

Example 43 was also repeated with the analogous 7-phenylacetamido compound.

Example 46

(a) *Conversion of 3- benzoylthiomethyl-7-(2'-thienylacetamido)-ceph - 3-em-4-oic acid into N-(7-2'-thienylacetamidoceph-3-em-3-ylmethyl) - pyridinium-4-carboxylate using mercuric nitrate in anhydrous media.*—The following results were obtained by dissolving the thiobenzoate (0.237 g., 0.5 mmole) in pyridine (2.5 ml.) and adding a mixture of anhydrous mercuric nitrate (0.406 g., 1.25 mmoles) dried several days over P$_2$O$_5$ in vacuo in the second solvent (2.5 ml.). The mixtures were heated at 50° for 5 hr., aliquots were removed at suitable intervals and assayed by electrophoresis, with elution of the spot corresponding to the pyridinium compound and measurement of its ultraviolet absorption at 240 and 255 m$\mu$. The following results represent the time taken to achieve the highest assay and the yield of the pyridinium compound at that time for mixtures of pyridine with each of the solvents named:

| Solvent | Time for max. assay | Yield |
|---|---|---|
| Acetonitrile | 3.0 hr | 27% |
| Acetone | 2.5–3.0 hr | 12% |
| N,N-dimethylformamide | 17 hr.‡ | 11% |

‡ This time of reaction was not established as the best.

(b) *Conversion of 3-benzoylthiomethyl-7-(2'-thienylacetamido)-ceph-3-em-4-oic acid into N-(7-2'-thienylacetamidoceph - 3 - em - 3 - ylmethyl) - pyridinium - 4 - carboxylate using mercuric perchlorate in anhydrous media.*—The following results were obtained by dissolving the thiobenzoate (0.238 g., 0.5 mmole) in pyridine (2.5 ml.) and adding a mixture of anhydrous mercuric perchlorate (1.25 mmoles) (prepared by freeze-drying 1.25 ml. of a 1 M-solution in water, and drying the product over P$_2$O$_5$ in vacuo for several days) in the second solvent (2.5 ml.). The mixtures (initial warming to ca. 35°) were left at 25–30° for 4 hr. and aliquots were removed at suitable intervals for ultraviolet assay as described in (a)

| Solvent | Time for max. assay | Yield |
|---|---|---|
| Acetonitrile | ca. 2 hr | 67% |
| N-methylpyrrolidone | <0.5 hr | 72% |

Example 47

*Preparation of N-7-(2'-thienylacetamidoceph-3-em-3-ylmethyl)-pyridinium-4-carboxylate from 2-(4'-carboxy-7' - 2" - thienylacetamidoceph - 3' - em - 3' - ylmethylthio)-4-methyl-pyrimidine.*—To a swirled solution of 2-(4' - carboxy - 7' - 2" - thienylacetamidoceph - 3' - em - 3'-ylmethylthio)-4-methylpyrimidine (4.6 g., 10 mmoles) in pyridine (50 ml.) was added a solution of freeze-dried mercuric perchlorate (8 g., 20 mmoles) in acetonitrile (50 ml.). The mixture was swirled at 50° for 20 min. and was then evaporated to dryness in a rotary evaporator at ≤40° over 35 min. The residue was suspended in water (100 ml.) and a stream of hydrogen sulphide passed through the suspension for 15 min. Any excess of hydrogen sulphide was removed by flushing with nitrogen for 20 min. before the precipitated mercuric sulphide was removed by filtration through kieselguhr. The filtrate was then passed down a column (3 cm. diameter) containing sections of Zeo-Karb 226 in the hydrogen cycle (20 ml.), De-acidite FF in the acetate cycle (60 ml.), Zeo-Karb 226 in the hydrogen cycle (20 ml.), and Dowex 1 in the acetate cycle (60 ml.). Elution of the column was continued using washings from the kieselguhr pad, until 1.5 l. had been collected; the eluates were then combined and freeze-dried. The freeze-dried solid (3.54 g.) was suspended in water (ca. 15 ml.) and the suspension (at pH 3.5), was adjusted to pH 4.5 by addition of ammonia. After filtration, to remove a small quantity of insoluble material, the filtrate was adjusted to pH 1.2 by addition of nitric acid. The nitrate salt of the pyridinium derivative separated as a pale yellow crystalline solid (2.9 g., 60%), $\lambda$ max. 237–239 m$\mu$ ($E_{1\,cm.}^{1\%}$ 314), $\lambda$ (inflexion) 255 m$\mu$ ($E_{1\,cm.}^{1\%}$ 286)

$[\alpha]_D$ +43° (C, 1.1 in pH 7-phosphate buffer).

In a similar experiment, use of dry mercuric nitrate (4 g., 12.4 mmoles) resulted in formation of the pyridinium derivative (0.68 g., 35%), $\lambda$ max. 240 m$\mu$ ($E_{1\,cm.}^{1\%}$ 369), $\lambda$ (inflexion) 255 m$\mu$ ($E_{1\,cm.}^{1\%}$ 337) (ratio 1.095)

$[\alpha]_D$ +43° (c. 1.0, water). The pyridinium derivative isolated from another experiment using mercuric nitrate had $\lambda$ max. 240 m$\mu$ ($E_{1\,cm.}^{1\%}$ 363) $\lambda$ (inflexion) 255 m$\mu$ ($E_{1\,cm.}^{1\%}$ 328) (ratio 1.09)

$[\alpha]_D$ +47° (c. 1.0, water).

Test-tube experiments with electrophoretic evaluation have shown that the pyridinium derivative is formed from the 4-methyl-2-mercaptopyrimidine derivative when the following solvents are mixed with pyridine in equal volumes, and mercuric nitrate is used as the electrophilic promoter. In each case the pyridinium derivative was recognised by the absorptivity ratio (aqueous solutions):

$$\frac{\text{Optical density at 238 m}\mu}{\text{Optical density at 255 m}\mu} = 1.1$$

(1) Dimethyl sulphoxide
(2) Dimethylacetamide
(3) Dimethylformamide
(4) Acetonitrile
(5) Absolute ethyl alcohol
(6) Nitromethane
(7) N-methylpyrrolidone Mobilities of the reaction products at pH 1.9 were compared with standard reference samples of the pyridinium derivative, detection being carried out under an ultraviolet lamp and by spraying with a potassium iodoplatinate reagent.

Following the general procedure of Example 47 other mercuric salts and solvents were used with the same starting materials. The results obtained were as follows:

| Mercuric Salt | Solvent [1] | Max. Yield (percent) | Time [2] (mins.) |
| --- | --- | --- | --- |
| Acetate | Acetone | 12 | 60 |
| Nitrate | do | 24 | 15 |
| Acetate | Acetonitrile | 10 | 60 |
| Nitrate | do | 59 | 40 |

[1] 50% of solvent specified with pyridine.
[2] Time (approx.) to maximum yield.

Example 48

Conversion of 2-(4'-carboxy-7'-2"-thienylacetamidoceph-3'-em-3'-ylmethylthio)-4-methylpyrimidine into N-7-(2'-thienylacetamidoceph-3-em-3-ylmethyl)pyridinium-4-carboxylate with metallic salts in anhydrous solvents.—

| | Promoter | Equivalents | Solvent | Max. Yield, (percent) | Time (mins.) |
| --- | --- | --- | --- | --- | --- |
| 1. | Hg(ClO$_4$)$_2$ | 2 | Acetonitrile | 80 | 40 |
| 2. | Hg(ClO$_4$)$_2$ | 3 | do | 80 | 20 |
| 3. | Hg(ClO$_4$)$_2$ | 3 | Nitromethane | 73 | 40 |
| 4. | Hg(ClO$_4$)$_2$ | 3 | Pyridine | 58 | 40 |
| 5. | Hg(BF$_4$)$_2$ | 2 | Acetonitrile | 60 | 50 |
| 6. | Hg(CN)$_2$ | 1–3 | do | <10 | 120 |
| 7. | AgBF$_4$ | 2 | do | 45 | 30 |

Reactions run at 50° with the solvent specified plus the same volume of pyridine.

Example 49

Conversion of 2-(4'-carboxy-7'-2"-thienylacetamidoceph-3'-em-3'-ylmethylthio)-4-methylpyrimidine (A) into $C_A$ compounds with mercuric perchlorate.—To the 2-mercapto-4-methyl pyrimidine derivative in the appropriate solvent was added the nucleophile and freeze-dried mercuric perchlorate (2 equiv.).

The reactions were examined after 15, 30, and 60 min. by paper electrophoresis at pH 1.9, at 30 v./cm. on Watman 3MM paper for 1½–3 hr. The $C_A$ compounds migrated towards the cathode and were located as spots absorbing ultraviolet light, and by their ability to stain with the iodoplatinate reagent.

The results are recorded below.

| | A, mg. | Nucleophile, mg. | Solvent, ml. | Temp. | Time, min. | Migration on electrophoresis towards the cathode (cm.) |
| --- | --- | --- | --- | --- | --- | --- |
| i | 20 | Isonicotinamide, 378 | CH$_3$CN, 2 | 35 | 0–60 | 1.2 |
| ii | 46 | Isonicotinamide, 61 | Me$_2$N.Ac, 1 | 50 | 0–60 | 1.5 |
| iii | 20 | α-Picoline, 0.25 ml. | CH$_3$CN, 0.25 | 35 | 0–60 | 1.5 |
| iv | 20 | Nicotinamide, 378 | CH$_3$CN, 2 | 35 | 0–60 | 1.1 |

Example 50

N-7-(2'-thienylacetamidoceph-3-em-3-ylmethyl-4"-carboxamidopyridinium-4-carboxylate.—A reaction was carried out as Example 49(i) except that the quantities and products were as follows: 2-(4'-carboxy-7'-2"-thienylacetamidoceph-3'-em-3'-ylmethylthio)-4-methylpyrimidine (23 mg.), isonicotinamide (9.2 mg.), acetonitrile (0.25 ml.), water (0.25 ml.), at 50°, for 60 min.; the product ran 1.5 cm. towards the cathode.

Example 51

Mercuric perchlorate promoted reaction between 3-benzoylthiomethyl-7-phenylacetamidoceph-3-em-4-oic acid and ethyl nicotinate.—3-benzoylthiomethyl-7-phenylacetamidoceph-3-em-4-oic acid (117 mg., 0.25 mmole) in ethyl nicotinate (1.25 ml.) was treated with mercuric perchlorate solution (0.625 ml.) [prepared by suspending yellow mercuric ocide (0.25 mole) in water (100 ml.) and adding perchloric acid (0.52 mole), stirring, filtering and making the filtrate up to 250 ml. with water] and subsequently diluted with acetonitrile (0.625 ml.). The reaction mixture was heated for 1 hr. at 50°. The black mixture was treated with a slow stream of hydrogen sulphide for 5 min., filtered and the precipitate was washed with water (10 ml.). The combined filtrate and washings were extracted successively with Amberlite LA 1 in benzene (2:1; 2 x 20 ml.), benzene (10 ml.) and methylene chloride (10 ml.). The aqueous layer was rotary evaporated to remove traces of organic solvents and then passed through a small column of Dowex 1

(OAc⁻ form) (10 ml.) The column was eluted with water until a total volume of 76 ml. was collected. This was lyophilised to give a pale yellow powder which on electrophoresis at 75 volts/cm. for 10 min. using a pH 1.9 buffer showed a single spot moving 0.7 cm. towards the cathode and giving a grey-brown colour when sprayed with aqueous potassium iodoplatinate. These properties were also shown by the product obtained from 7-phenyl-acetamidocephalosporanic acid and ethyl nicotinate by the method of Hale, Newton and Abraham, Biochemical Journal, 1961, 79, 403.

*Example 52*

(a) *2-(7-D-5″-amino-5″-carboxypentanamido-4′ - carboxyceph-3′-em-3′-ylmethyl)thio-4,6-dimethyl pyrimidine (potassium salt).*—The potassium salt of cephalosporin C (50.0 g.) was added to a hot solution (80°) of 4,6-dimethyl-2-mercaptopyrimidine, prepared by dissolving 4,6-dimethyl-2-mercaptopyrimidine hydrochloride (23.4 g.; 1.2 equiv.) in water (200 ml.) and adjusting the solution to pH 6.0 with sodium hydroxide solution. The mixture was heated at 80° under nitrogen for 1 hr., cooled and kept in the refrigerator overnight. The title compound crystallised (6.02 g., 10%) in a nearly pure form, $[\alpha]_D^{20°}$ $-41°$ (c., 1.0 $H_2O$), $\lambda$ max. 265 m$\mu$ ($E_{1\,cm.}^{1\%}$ 339

$\epsilon$ 18,100); Rf 0.24 relative to 7-phenylacetamidocephalosporanic acid (n—PrOH—$H_2O$, 7:3); moving as a cation, 2.5 cms. in 90 mins. at pH 1.9 and 16 volts per cm.

Reducing the volume of the filtrate by concentration in vacuo gave a second crop of product (17.92 g.; 30%)

$\lambda$ max. 265-268 m$\mu$ ($E_{1\,cm.}^{1\%}$ 320)

Final precipitation of the filtrates by addition of ethanol gave a much crude product (18.91 g.; 32%), $\lambda$ max. 262-266 m$\mu$ ($E_{1\,cm.}^{1\%}$ 254)

(b) *N-(7-D-5′-amino-5′-carboxypentanamido-ceph - 3-em-3-ylmethyl) pyridinium-4-carboxylate.*—By a similar procedure to example 24 but using 2-(7-D-5″-amino-5″-carboxypentanamido-4′-carboxyceph-3′-em-3′ - ylmethyl)-thio-4,6-dimethylpyrimidine, the compound named in the title was obtained in 63% yield; $[\alpha]_D^{20°}$ $+14°$ (c., 1.0 $H_2O$), Rf 0.062, relative to 7-phenylacetamidocephalosporanic acid (n—PrOH—$H_2O$, 7:3); moving as a cation 3.1 cm. in 70 mins. at 16 volts per cm. in a pH 1.9 buffer. This was identical to the material obtained by direct replacement of the acetoxy group of cephalosporin C by pyridine.

*Example 53*

(a) *2-(7′-amino-4′-carboxyceph-3′-em-3′-ylmethyl) thio-4,6-dimethylpyrimidine.*—By the procedure of Preparation 12, 7-aminocephalosporanic acid and 4,6-dimethyl-2-mercaptopyrimidine gave the title compound in 53% yield; $[\alpha]_D^{20°}$ $-104°$ (c., 1.0; 3%—$NaHCO_3$)

$\lambda$ max. 266-268 m$\mu$ ($E_{1\,cm.}^{1\%}$ 430

$\epsilon$ 15,100); Rf 0.71 relative to 7-phenylacetamidocephalosporanic acid (n—PrOH—$H_2O$, 7:3); ran (pH 1.9 buffer) 3.5 cm. in 90 mins. at 16 volts per cm. as a cation.

(b) *7-aminoceph-3-em-3-ylmethylpyridinium-4 - carboxylate.*—By the method of Example 26b, but with 2(7′-amnio-4′-carboxyceph-3′-em 3′-ylmethyl)thio - 4,6 - dimethylpyrimidine) there was obtained a crude sample of the *title compound* contaminated with 4,6-dimethyl-2-mercaptopyrimidine. The title compound, Rf 0.21 relative to 7-phenylacetamidocephalosporanic acid (n—PrOH—$H_2O$, 7:3)

moved as a cation on electrophoresis at pH 1.9, 6.2 cm. in 90 mins. at 16 volts per cm. The compound gave a yellow colour with Ninhydrin reagent.

Example 54 is an example of the use of a metal salt-pyridine reagent complex.

*Example 54*

(i) Aqueous mercuric perchlorate solution (0.40 M, 20 ml., prepared by dissolving yellow mercuric oxide in a slight excess of perchloric acid) was added at 0° C. to pyridine (20 ml.). The precipitate was washed with cold water and recrystallized from hot water. The colourless needles were dried under vacuum over $P_2O_5$ (3.75 g., 84%), M.P. 343° C. (decomp.). (Found: C, 21.6; H, 2.1 Hg, 34.9; N, 5.3. $C_{10}H_{10}Cl_2HgN_2O_8$ requires C, 21.6; H, 1.8; Hg, 36.0; N, 5.0%.)

(ii) 3-picolinoylthiomethyl-7 - (2′ - thienylacetamido) ceph-3-em-4-oic acid (1.19 g.) was dissolved in 10 ml. pyridine. Water (10 ml.) was added and the solution cooled to 23° C. Dipyridinemercury (II) perchlorate (3.35 g., 2.4 equiv., prepared as in (i)) in 20 ml. aqueous pyridine (1:1 by vol.) was added to the stirred solution over 2 min. After 1 hr. at 23° C., hydrogen sulphide was passed in for 5 min. and the black precipitate filtered off. The filtrate was worked up as described in Example 26 to yield the hydronitrate salt. The hydronitrate was dried over $P_2O_5$ at 1 mm. (0.74 g., 62%), $\lambda$ max. ($H_2O$) 237-239 m$\mu$ ($E_{1\,cm.}^{1\%}$ 354) and $\lambda$ inf. 255 m$\mu$ ($E_{1\,cm.}^{1\%}$ 318).

The hydronitrate may be converted to the betaine as described in Example 26.

*Example 55*

*N-(7-2′-thienylacetamidoceph-3-em - 3 - ylmethyl)pyridinium-4-carboxylate from the cyclohexylamine salt of S-(7-2′-thienylacetamido-4-carboxyceph-3-em-3 - ylmethyl) N,N-dimethyldithiocarbamate, using mercuric perchlorate.*—To a solution of the cyclohexylamine salt of the dimethyldithiocarbamate derivative (55 mg., 1 mmole) in pyridine (0.5 ml.) and water (0.25 ml.) was added 1 M-mercuric prechlorate solution (0.25 ml., 2.5 equiv.). The mixture was heated at 50° for 45 mins. Aliquots were withdrawn at suitable intervals and the amount of the desired pyridinium compound that had been formed was estimated by paper chromatography.

| Time (mins.) | Ratio $E_{1\,cm.}^{1\%}$ at 240 m$\mu$ / $E_{1\,cm.}^{1\%}$ at 255 m$\mu$ | Yield, percent |
|---|---|---|
| 3 | 1.02 | 27 |
| 5 | 1.1 | 29 |
| 7 | 1.07 | 30 |
| 10 | 1.1 | 34 |
| 15 | 1.09 | 36 |
| 30 | 1.1 | 35 |
| 45 | 1.1 | 34 |

The upper phase of a mixture of butanol, ethanol, water 4:1:5 was used as the solvent and the tank was equilibrated with the lower phase. Whatman No. 3MM papers were used and the chromatograms were run overnight by downward displacement. The derivative was located, isolated, and estimated by similar methods to those used in the paper electrophoretic assay described above using the spectral characteristics of a pure sample of the pyridinium derivative.

In Example 56 we show that it is not necessary to use aqueous media either in the preparation of the compound (V) or the compounds (IV) and moreover that the former need not be separated before converting it to the latter.

*Example 56*

*Preparation of N-(7-2′-thienylacetamidoceph-3-em-3-ylmethyl)-pyridinium-4-carboxylate from 7-(2′-thienyl-acetamido)-cephalosporanic acid in formamide by means of sodium thiosulphate and mercuric perchlorate.*—To a solution of anhydrous sodium thiosulphate (0.88 g., 1.1 equiv.) in formamide (25 ml.) at 100° was added sodium 7-(2′-thienylacetamido)-cephalosporanate (2.09 g.). The mixture was heated at 100° for 20 min. and was then cooled. The amount of thiosulphate derivative that had been formed was estimated by paper chormatography to be about 57% using methods similar to those in the preceding example.

To part of the reaction mixture (13.5 ml.) cooled to 40° was added pyridine (13.5 ml.) and freeze-dried mercuric perchlorate (2.5 g., 2.5 equiv.). This mixture wash stirred at 40° during 35 min. whilst aliquots were removed at intervals. The amount of the desired pyridinium compound that had been formed was estimated by the paper electrophoretic method described above.

| Time (mins.) | Percent Pyridinium Cpd. |
|---|---|
| 5 | 30.5 |
| 10 | 32.2 |
| 15 | 35 |
| 20 | 36.5 |
| 30 | 35 |
| 35 | 40 |

We claim:
1. In a process for the preparation of a compound of the formula:

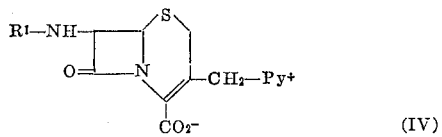

(IV)

in which $R^1$ is a carboxylic acyl group selected from the group consisting of thienylacetyl and phenylacetyl and Py is selected from the group consisting of pyridine and nuclear-substituted pyridines, the step which comprises reacting a compound of the formula:

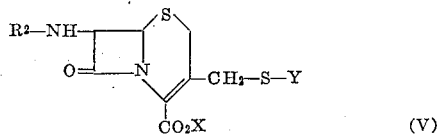

(V)

in which $R^2$ is selected from the group consisting of said carboxylic acyl groups and hydrogen; the moiety —S—Y is the residue of a nucleophile YSH, and X is a cation, with a compound Py in the presence of a dissolved salt of a metal selected from the group consisting of mercury, silver and gold, said salt being able to complex with the moiety —S—Y and to ionize in water, the resulting compound where $R^2$ represents hydrogen thereafter being acylated.

2. A process as defined in claim 1 when the group $R^2$ is a carboxylic acyl group.
3. A process as defined in claim 1 in which said salt is a mercuric salt.
4. A process as defined in claim 1 in which the reaction is effected in water.
5. A process as defined in claim 1 in which the reaction with the compound Py is effected at a temperature of 20° to 100° C.
6. A process as defined in claim 1 in which the reaction is effected in formamide.
7. A process as defined in claim 1 in which the compound Py is pyridine.
8. A process as defined in claim 1 in which the compound of Formula V has the formula:

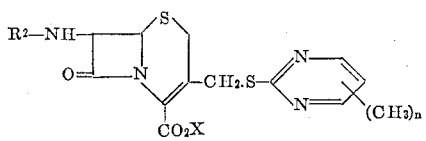

where $R^2$ and X have the meanings defined in claim 1 and $n$ is at least 1 and not greater than 2.

9. A process as defined in claim 1 in which the compound of Formula V has the formula:

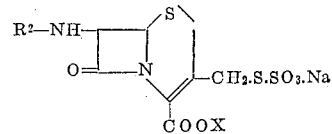

where $R^2$ and X have the meanings defined in claim 1.

10. A process as defined in claim 1 in which the compound of Formula V has the formula:

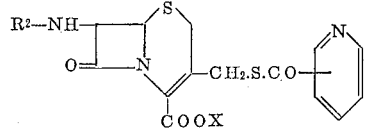

where $R^2$ and X have the meanings defined in claim 1.

11. A process as defined in claim 1 in which the compound of Formul V has the formula:

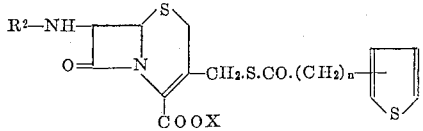

where $n$ is not greater than 1 and where $R^2$ and X have the meanings defined in claim 1.

12. A process as defined in claim 1 in which the compound of Formula V has the formula:

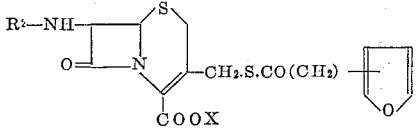

where $n$ is not greater than 1 and where $R^2$ and X have the meanings defined in claim 1.

13. A process as defined in claim 1 in which the salt is mercuric nitrate.
14. A process as defined in claim 1 in which the salt is mercuric perchlorate.
15. A process as defined in claim 1 in which the salt is mercurous perchlorate.
16. A process as defined in claim 1 in which the salt is mercuric trifluoroacetate.
17. In a process for the preparation of N-(7-2'-thienylacetamidoceph-3-em-3-ylmethyl)-pyridinium - 4 - carboxylate having the formula

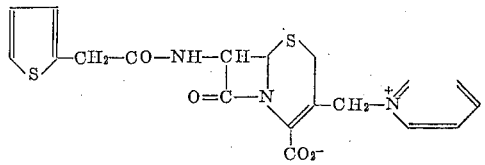

the step which comprises reacting a compound of the formula:

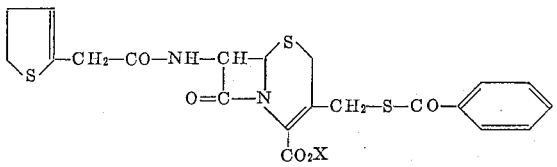

where X is a cation, with pyridine in the presence of a dissolved mercuric salt, said salt being able to complex with the thiobenzoate moiety and to ionize in water.

No references cited.

HENRY R. JILES, *Acting Primary Examiner.*

JAMES W. ADAMS, Jr, *Assistant Examiner.*